United States Patent
Terada et al.

(10) Patent No.: US 7,665,899 B2
(45) Date of Patent: Feb. 23, 2010

(54) OUTER RING, DRAWN CUP NEEDLE ROLLER BEARING, DRAWN CUP NEEDLE ROLLER BEARING STRUCTURED BODY, PISTON PIN SUPPORTING STRUCTURE OF ENGINE, CRANKSHAFT SUPPORTING STRUCTURE OF ENGINE, AND 2-CYCLE ENGINE

(75) Inventors: Tomoaki Terada, Iwata (JP); Kenichi Ichikawa, Iwata (JP)

(73) Assignee: NTN Corporation, Osaka (JP)

( * ) Notice: Subject to any disclaimer, the term of this patent is extended or adjusted under 35 U.S.C. 154(b) by 471 days.

(21) Appl. No.: 11/510,606

(22) Filed: Aug. 28, 2006

(65) Prior Publication Data

US 2007/0047864 A1    Mar. 1, 2007

(30) Foreign Application Priority Data

Aug. 30, 2005  (JP) .............................. 2005-249719
Nov. 30, 2005  (JP) .............................. 2005-345804
Nov. 30, 2005  (JP) .............................. 2005-345805

(51) Int. Cl.
*F16C 33/58* (2006.01)
(52) U.S. Cl. .................................................. 384/569
(58) Field of Classification Search ................. 384/569, 384/572, 575, 579, 580
See application file for complete search history.

(56) References Cited

U.S. PATENT DOCUMENTS 3,080,639 A    3/1963   Maurizi et al.

4,978,237 A * 12/1990   Motohashi et al. .......... 384/580
5,826,988 A * 10/1998   Furukawa et al. ........... 384/572

FOREIGN PATENT DOCUMENTS

| DE | 196 54 584 A1 | 7/1997 |
| EP | 0 342 611 | 11/1989 |
| JP | 7-332371 | 12/1995 |

(Continued)

OTHER PUBLICATIONS

K. Rennels, "Current Methodologies for Geometric Dimensioning and Tolerancing" Proceedings Electrical Insulation Conference and Electrical Manufacturing and Coil Winding Conference, Indianapolis, Sep. 23-25, 2003, pp. 565-570.

(Continued)

*Primary Examiner*—Thomas R Hannon
(74) *Attorney, Agent, or Firm*—Clark & Brody

(57) ABSTRACT

The straightness and parallelism of a track surface on which rollers roll are measured within a range "L2" as a range for measuring the straightness and parallelism. The range "L2" is a range such that $L2 \geqq 0.8 \times L$ when a roller length is "L". When the dimension from the corner P of the flange on the inner diameter side to the starting point of the range "L2" is "L1", the dimension "L1" is ranged such that $0.8 \text{ mm} \leqq L1 \leqq 2$ mm. In this range, the straightness of the track surface of the outer ring in the axial direction is not more than 0.008 mm and the parallelism thereof is not more than 0.015 mm.

10 Claims, 13 Drawing Sheets

FOREIGN PATENT DOCUMENTS

| | | |
|---|---|---|
| JP | 2002-235753 | 8/2002 |
| JP | 2004-116718 | 4/2004 |
| JP | 2004-293627 | 10/2004 |
| JP | 2004-324760 | 11/2004 |
| JP | 2005-098368 | 4/2005 |

OTHER PUBLICATIONS

R. Thalmann, "Intercomparison of parallelism measurements", *Measurement* vol. 17, No. 1, Jan. 1, 1996, pp. 17-27.

"Waelzlager 305", 1987, Ina Waelzlager Schaeffler Kg, Herzogenaurach, XP002487830, p. 73.

* cited by examiner

OUTER RING, DRAWN CUP NEEDLE ROLLER BEARING, DRAWN CUP NEEDLE ROLLER BEARING STRUCTURED BODY, PISTON PIN SUPPORTING STRUCTURE OF ENGINE, CRANKSHAFT SUPPORTING STRUCTURE OF ENGINE, AND 2-CYCLE ENGINE

BACKGROUND OF THE INVENTION

1. Field of the Invention

The present invention relates to a outer ring press fitted in a housing and having a track surface on its inner diameter surface, a drawn cup needle roller bearing, a drawn cup needle roller bearing structured body, a piston pin supporting structure of an engine, a crankshaft supporting structure of an engine, and a 2-cycle engine comprising the above outer ring.

2. Description of the Background Art

A 2-cycle engine having small capacity is used in a utility engine of a bush cutter and the like. A technique regarding the 2-cycle engine is disclosed in Japanese Unexamined Patent Publication No. 7-332371.

FIG. 14 is a longitudinal sectional view showing a 2-cycle engine in which roller bearings are used at the small end part and large end part of a connecting rod con-rod). Referring to FIG. 14, the 2-cycle engine comprises a crankshaft 83 outputting rotary motion, a piston 85 moving in a linear line back and forth, and a con-rod 84 connecting the crankshaft 83 to the piston 85 and converting the linear reciprocating motion to the rotary motion. The crankshaft 83 rotates around a rotation center shaft 90 and keeps a rotation balance with a balance weight 91.

The mixed gas of gasoline and lubricant oil is sent from an inlet 87 to a crank chamber 82 and then led to a combustion chamber 89 arranged at the upper part of a cylinder 81 according to the vertical motion of the piston 85. The exhaust gas is discharged from an exhaust hole 88.

The con-rod 84 comprises a large end part 93 at the lower part of a linear rod and a small end part 94 at the upper part thereof. The crankshaft 83 is rotatably supported at the large end part 93 of the con-rod 84 through a roller bearing 86 mounted in an inner diameter hole, and a piston pin 92 connecting the piston 85 to the con-rod 84 is rotatably supported by a roller bearing 86 mounted in an inner diameter hole.

As the roller bearings 86 mounted in the inner diameter holes provided at the small end part and the large end part of the con-rod 84 to support the piston pin 92 and the crankshaft 83, a drawn cup needle roller bearing that can receive high load in spite of its small projected area and highly rigid is used. Here, the drawn cup needle roller bearing comprises a outer ring formed of a steel plate processed by drawing, a plurality of rollers and a retainer. The retainer comprises pockets for holding the rollers and the interval of the rollers is retained by a column part positioned between the pockets.

Here, one manufacturing method of the retainer contained in the above drawn cup needle roller bearing will be briefly described hereinafter. First, a band steel that is the material of the retainer is punched out to form a pocket having a size in which the roller can be held. Then, it is pressed into a V-shaped form in section at a pressing step. Then, it is cut to the circumferential length of the retainer, and the cut band steel is bent into a cylindrical shape and the end faces of the bent band steel are connected by welding and the like. Then, it is heat treated, whereby the retainer is completed.

Here, when the band steel is pressed so that its sectional configuration becomes V shape, since its height in the diameter direction can be largely ensured, the following effect is provided. FIGS. 15A and 15B are sectional views showing the cut band steel in the diameter direction after the pressing process before and after it is bent into the cylindrical shape. Since the interval of column parts 106 on the side of an inner diameter surface 112 before a retainer 104 is bent into the cylindrical shape (FIG. 15A) becomes small after the retainer 104 is bent into the cylindrical shape (FIG. 15B), a roller 103 held in the pocket is prevented from falling off toward the side of the inner diameter surface 112. In this case, the roller 103 may be prevented from escaping toward the side of an outer diameter surface 111 by providing a roller escape preventing part at the column part 106 on the side of the outer diameter surface 111.

In addition, FIG. 16 is a view showing a state in which the retainer 104 retaining the roller 103 is incorporated in a outer ring 102 and a shaft 101. By performing the pressing process so that its sectional configuration becomes V shape, the roller 103 can be guided in the vicinity of a PCD (Pitch Circle Diameter) 105 in which the roller 103 can roll most stably when guided.

In addition, a retainer of a roller bearing having the same configuration as that of the retainer manufactured by the above steps is disclosed in Japanese Unexamined Patent Publication No. 2005-98368.

A description will be made of a method for measuring the precision of the outer ring 102 contained in the above drawn cup needle roller bearing hereinafter. The outer ring 102 has a track surface on which the roller rolls, at its cylindrical inner diameter surface 119. Regarding the track surface of the outer ring 102, since it is necessary that the roller can roll stably, high dimensional precision is required.

When the precision of the track surface of the outer ring 102 in which the high dimensional precision is required is measured, a variation in thickness dimension in the circumferential direction, that is, a variation in thickness of the cylindrical part of the outer ring 102 has been measured. FIG. 17 is a view showing a state when the variation in thickness of the cylindrical part of the outer ring 102 is measured in this case. Referring to FIG. 17, the outer ring 102 has a track surface on which the roller rolls, on the side of the inner diameter surface 119 of its cylindrical part 116. Here, the variation in thickness of the cylindrical part 116 is measured such that while an outer diameter surface 118 is pressed with a reference member 117 at the position shown by an arrow X or Y in FIG. 17 and the corresponding inner diameter surface 119 is pressed with a gauge terminal, the outer ring 102 is rotated.

In addition, a drawn cup needle roller bearing comprising a outer ring having a track surface on its inner diameter surface, in which a thickness difference is provided at a cylindrical part is disclosed in Japanese Unexamined Patent Publication No. 2002-235753.

According to the method of measuring the precision of the above outer ring contained in the drawn cup needle roller bearing, when the thickness of the cylindrical part is measured, the variation in thickness of the cylindrical part 116, that is, a difference in thickness in the circumferential direction is measured. However, this is not necessarily optimal as a precision parameter for evaluating whether the roller can roll stably. Especially, since the cylindrical part 116 of the outer ring 102 is relatively thin, and it could be deformed at a heat treatment and the like, it is necessary to measure the configuration after press fitted.

In this case, while the outer ring is press fitted in an inner diameter hole provided in a reference ring having a reference surface for parallelism and the like, the generatrix configuration of the inner diameter surface of the outer ring is measured and this is to be set to the precision parameter. However, when the generatrix configuration is set to the precision parameter as it is, since the generatrix configuration is measured including a part other than the surface on which the roller rolls, it cannot be correctly evaluated whether the roller can roll stably or not.

Meanwhile, among the above manufacturing steps of the retainer, at the pocket punching-out step, the blade of a punch is pressed against the material of the retainer along a pocket configuration to punch out the pocket. In this case, a sheared surface and a fractured surface are generated in the side wall surface of the pocket, that is, the side wall surface of the column part positioned between the pockets. The sheared surface is a smooth surface punched out with the edge of the blade of the punch and the like. Meanwhile, the fractured surface is a coarse surface fractured by the material pressed and punched out with the blade edge.

Here, when the pocket is punched out from the side that becomes the inner diameter surface when the retainer is bent into the cylindrical shape at the pocket punching-out step, the fractured surface is positioned in the side wall surface of the column part on the side of the outer diameter surface.

FIG. 18 is a sectional view showing the retainer 104 in the diameter direction in this case. FIG. 19 is a sectional view showing the retainer 104 in the axial direction in this case. In FIG. 19, the part shown by a dotted line designates the roller 103 retained in the pocket of the retainer 104, and a dashed line designates the PCD 105. Referring to FIGS. 18 and 19, when the pocket is punched out from the direction shown by an arrow Z in the drawing that becomes the inner diameter surface 112, a sheared surface 108 is positioned on the side of the inner diameter surface 112 of a side wall surface 110, and a fractured surface 109 is positioned on the side of the outer diameter surface 111 of the side wall surface 110. Here, since the retainer 104 is pressed into the V shape, when it retains the roller 103, the fractured surface 109 is positioned at the center part of the side wall surface 110 in the vicinity of the PCD 105 and the sheared surface 108 is positioned at the end of the side wall surface 110 in the vicinity of the PCD 105.

A configuration curve 114 of the side wall surface 110 at the PCD 105 in this case is shown in FIG. 20 together with an outline 113 of the roller 103. Referring to FIG. 20, in the side wall surface 110, the center part is the fractured surface 109 and the end is the sheared surface 108. In this case, the configuration line 114 is recessed at the center part with respect to the outline 113, so that the roller 103 is in contact with the sheared surface 108 at the end of the side wall surface 110 when guided.

However, since the end of the roller 103 is chamfered and the end of the side wall surface 110 does not follow the outline 113 of the roller 103, the roller cannot be appropriately in contact with it, so that the roller 103 cannot be guided stably.

In the drawn cup needle roller bearing comprising the above retainer and outer ring, the roller cannot roll stably. In addition, when the above drawn cup needle roller bearing is used in a piston pin supporting structure of an engine and the like, the roller is skewed and seizing could be generated.

SUMMARY OF THE INVENTION

It is an object of the present invention to provide a outer ring and drawn cup needle roller bearing in which the roller can roll stably.

It is another object of the present invention to provide a drawn cup needle roller bearing and a drawn cup needle roller bearing structured body in which a roller can roll stably.

It is still another object of the present invention to provide a piston pin supporting structure of an engine, a crankshaft supporting structure of an engine and a 2-cycle engine in which an anti-seizing property is improved.

A outer ring according to the present invention comprises a track surface on the side of an inner diameter. Here, when the outer ring is press fitted in a reference ring having an inner diameter hole in which the outer ring is to be press fitted, the straightness of the track surface of the outer ring in the axial direction is not more than 0.008 mm, and the parallelism based on the inner diameter surface or outer diameter surface of the reference ring is not more than 0.015 mm.

According to the above constitution, while the outer ring is press fitted in the inner diameter hole provided in the reference ring, the track surface on which the roller rolls can be provided so as to be straight and parallel. Thus, the rolling surface of the roller and the track surface of the outer ring positioned on the inner diameter surface can be in contact with each other appropriately at the time of rolling, so that the roller can roll stably. Here, the straightness is a difference between a maximum thickness and a minimum thickness of the track surface of the outer ring in the axial direction when it is press fitted in the reference ring, and the parallelism is a degree of parallelism between the inner diameter surface of the reference ring serving as the reference surface and the track surface of the outer ring. In addition, when the inner diameter surface and the outer diameter surface of the reference ring are coaxially provided, the outer diameter surface of the reference ring can be the reference surface of the parallelism.

According to still another aspect of the present invention, a drawn cup needle roller bearing comprises the above outer ring and a plurality of rollers. Thus, since the roller can roll stably in the drawn cup needle roller bearing comprising the above outer ring, the anti-seizing property and the like can be improved.

According to the present invention, while the outer ring is press fitted in an inner diameter hole provided in a reference ring, the track surface on which the roller rolls can be provided so as to be straight and parallel. Thus, since the rolling surface of the roller and the track surface of the outer ring positioned on the inner diameter surface can be appropriately in contact with each other at the time of rolling, the roller can roll stably.

In addition, since the roller can roll stably in the drawn cup needle roller bearing comprising the above outer ring, the anti-seizing property and the like can be improved.

A drawn cup needle roller bearing according to the present invention comprises a plurality of rollers, a outer ring having a track surface in its inner diameter side, and a retainer retaining the rollers. When the outer ring is press fitted in a reference ring having an inner diameter hole in which the outer ring is to be press fitted, the straightness of the track surface of the above-described outer ring in the axial direction is not more than 0.008 mm, and the parallelism based on the inner diameter surface or outer diameter surface of the reference ring is not more than 0.015 mm. The retainer comprises a pair of annular parts, and column parts connecting the pair of annular parts so as to form pockets for housing the rollers. Here, the side wall surface of the column part comprises a sheared surface provided when the pocket is formed by a punching blade, and a fractured surface fractured by a material pressed by the punching blade. The above-described roller is guided by the sheared surface.

According to the above constitution, in the retainer contained in the drawn cup needle roller bearing, the roller can be guided by the smooth sheared surface along the roller outline positioned at the center part in the side wall surface of the column part. In addition, according to the outer ring contained in the drawn cup needle roller bearing, while the outer ring is press fitted in the inner diameter hole of a reference ring, the track surface on which the roller rolls can be provided so as to be straight and parallel. Thus, the roller rolling surface and the track surface positioned on the inner diameter surface of the outer ring can be appropriately in contact with each other at the time of rolling.

In the drawn cup needle roller bearing containing the above retainer and the outer ring, the roller can roll stably. Here, the straightness is a difference between a maximum thickness and a minimum thickness of the track surface of the outer ring in the axial direction when it is press fitted in the reference ring, and the parallelism is a degree of parallelism between the inner diameter surface of the reference ring serving as the reference surface and the track surface of the outer ring. In addition, when the inner diameter surface and the outer diameter surface of the reference ring are coaxially provided, the outer diameter surface of the reference ring can be the reference surface of the parallelism.

Preferably, the column part has a configuration in which its center part is recessed toward the inner side of the diameter direction, the sheared surface is positioned on the outer side of the diameter direction and the fractured surface is positioned on the inner side of the diameter direction. Thus, the sheared surface can be positioned in the vicinity of the PCD, so that the roller can be guided stably.

More preferably, the length of the sheared surface that guides the roller in the axial direction is not less than 60% of the length of the roller in the axial direction. Thus, in the retainer contained in the drawn cup needle roller bearing, the guiding surface for guiding the roller stably can be largely ensured, so that the roller can roll more stably.

According to the present invention, in the retainer contained in the drawn cup needle roller bearing, the roller can be guided by the smooth sheared surface along the roller outline positioned at the center part in the side wall surface of the column part. In addition, according to the outer ring contained in the drawn cup needle roller bearing, while the outer ring is press fitted in the inner diameter hole of a reference ring, the track surface on which the roller rolls can be provided so as to be straight and parallel. Thus, the roller rolling surface and the track surface positioned on the inner diameter surface of the outer ring can be appropriately in contact with each other at the time of rolling.

As a result, the roller can roll stably in the drawn cup needle roller bearing and the drawn cup needle roller bearing structured body.

A piston pin supporting structure of an engine according to the present invention comprises a con-rod converting linear reciprocating motion to rotary motion and having an inner diameter hole at a small end part, a piston pin connecting the con-rod and a piston through the inner diameter hole, and a drawn cup needle roller bearing press fitted in the inner diameter hole and supporting the piston pin. The above drawn cup needle roller bearing comprises a outer ring, a plurality of rollers, and a retainer retaining the rollers. When the outer ring is press fitted in a reference ring having an inner diameter hole in which the outer ring is to be press fitted, the straightness of the track surface of the above-described outer ring in the axial direction is not more than 0.008 mm, and the parallelism based on the inner diameter surface or outer diameter surface of the reference ring is not more than 0.015 mm. The retainer comprises a pair of annular parts, and column parts connecting the pair of annular parts so as to form pockets for housing the rollers. Here, the side wall surface of the column part comprises a sheared surface provided when the pocket is formed by a punching blade, and a fractured surface fractured by a material pressed by the punching blade. The above-described roller is guided by the sheared surface.

According to the above constitution, in the retainer contained in the drawn cup needle roller bearing, the roller can be guided by the smooth sheared surface along the roller outline positioned at the center part in the side wall surface of the column part. In addition, according to the outer ring contained in the drawn cup needle roller bearing, while the outer ring is press fitted in the inner diameter hole provided at the small end part of the con-rod, the track surface on which the roller rolls can be provided so as to be straight and parallel. Thus, the roller rolling surface and the track surface positioned on the inner diameter surface of the outer ring can be appropriately in contact with each other at the time of rolling.

In the drawn cup needle roller bearing containing the above retainer and the outer ring, the roller can roll stably. Therefore, the piston pin supporting structure of the engine comprising the above drawn cup needle roller bearing can improve its anti-seizing property. Here, the straightness is a difference between a maximum thickness and a minimum thickness of the track surface of the outer ring in the axial direction when it is press fitted in the reference ring, and parallelism is a degree of parallelism between the inner diameter surface of the reference ring serving as the reference surface and the track surface of the outer ring. In addition, when the inner diameter surface and the outer diameter surface of the reference ring are coaxially provided, the outer diameter surface of the reference ring can be the reference surface of the parallelism.

According to another aspect of the present invention, a crankshaft supporting structure of an engine comprises a con-rod converting linear reciprocating motion to rotary motion and having an inner diameter hole at a large end part, a crankshaft connected to the large end part of the con-rod through the inner diameter hole and outputting the rotary motion, and a drawn cup needle roller bearing press fitted in the inner diameter hole and supporting the crankshaft. The above drawn cup needle roller bearing comprises a outer ring, a plurality of rollers, and a retainer retaining the rollers. When the outer ring is press fitted in a reference ring having an inner diameter hole in which the outer ring is to be press fitted, the straightness of the track surface of the above-described outer ring in the axial direction is not more than 0.008 mm, and the parallelism based on the inner diameter surface or outer diameter surface of the reference ring is not more than 0.015 mm. The retainer comprises a pair of annular parts, and column parts connecting the pair of annular parts so as to form pockets for housing the rollers. Here, the side wall surface of the column part comprises a sheared surface provided when the pocket is formed by a punching blade, and a fractured surface fractured by a material pressed by the punching blade. The above-described roller is guided by the sheared surface.

According to the above constitution, similar to the above, in the retainer contained in the drawn cup needle roller bearing, the roller can be guided by the smooth sheared surface along the roller outline positioned at the center part in the side wall surface of the column part. In addition, according to the outer ring contained in the drawn cup needle roller bearing, while the outer ring is press fitted in the inner diameter hole provided at the large end part of the con-rod, the track surface on which the roller rolls can be provided so as to be straight and parallel. Thus, the roller rolling surface and the track surface positioned on the inner diameter surface of the outer ring can be appropriately in contact with each other at the time of rolling.

In the drawn cup needle roller bearing containing the above retainer and the outer ring, the roller can roll stably. Therefore, the crankshaft supporting structure of the engine comprising the above drawn cup needle roller bearing can improve its anti-seizing property.

According to still another aspect of the present invention, a 2-cycle engine comprises any piston pin supporting structure of the engine described above.

According to still another aspect of the present invention, a 2-cycle engine comprises any crankshaft supporting structure of the engine described above.

According to the above constitution, the 2-cycle engine can improve its anti-seizing property.

According to the present invention, in the retainer contained in the drawn cup needle roller bearing, the roller can be guided by the smooth sheared surface along the roller outline positioned at the center part in the side wall surface of the column part. In addition, according to the outer ring contained in the drawn cup needle roller bearing, while it is press fitted in the inner diameter hole provided at the small end part of the con-rod, the track surface on which the roller rolls can be provided so as to be straight and parallel. Thus, the roller rolling surface and the track surface positioned on the inner diameter surface of the outer ring can be appropriately in contact with each other at the time of rolling.

In the drawn cup needle roller bearing containing the above retainer and the outer ring, the roller can roll stably. Therefore, the piston pin supporting structure of the engine comprising the above drawn cup needle roller bearing can improve its anti-seizing property. Similarly, the crankshaft supporting structure of the engine comprising the above drawn cup needle roller bearing can improve its anti-seizing property.

In addition, with the above piston pin supporting structure of the engine or the crankshaft supporting structure of the engine, the 2-cycle engine can improve its anti-seizing property.

According to another aspect of the present invention, a drawn cup needle roller bearing structured body comprises a housing having an inner diameter hole, and a drawn cup needle roller bearing comprising a plurality of rollers, a outer ring having a track surface in its inner diameter side, and a retainer and press fitted in the inner diameter hole of the housing. Here, the retainer in the above drawn cup needle roller bearing comprises a pair of annular parts, and column parts connecting the pair of annular parts so as to form pockets for housing the rollers. The above column part has a configuration in which its center part is recessed toward the inner side of the diameter direction. Here, the side wall surface of the column part comprises a sheared surface provided when the pocket is formed by a punching blade on the outer side of its diameter direction, and a fractured surface fractured by a material pressed by the punching blade on the inner side of its diameter direction. Here, when the outer ring is press fitted in a reference ring having an inner diameter hole in which the outer ring is press fitted, the straightness of the track surface of the outer ring in the axial direction is not more than 0.008 mm, and the parallelism based on the inner diameter surface or outer diameter surface of the reference ring is not more than 0.015 mm.

Since the drawn cup needle roller bearing structured body comprises the drawn cup needle roller bearing comprising the retainer and the outer ring in which the roller can roll stably, the roller can be prevented from being skewed and the anti-seizing property can be improved.

DESCRIPTION OF THE PREFERRED EMBODIMENTS

Figure 1:
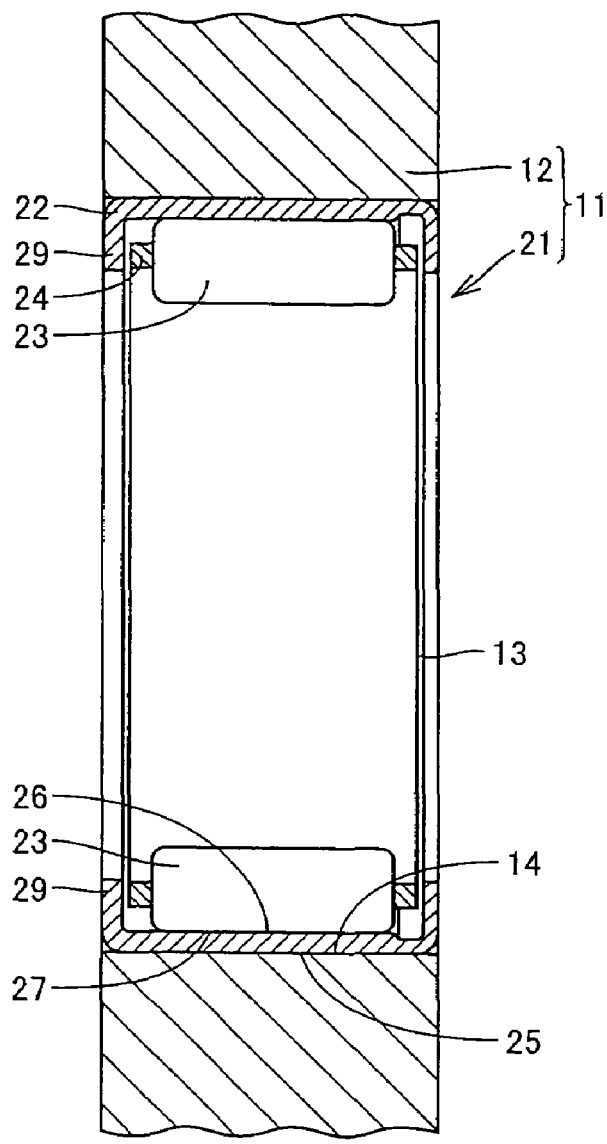
FIG. 1 is a sectional view showing a part of a drawn cup needle roller bearing structured body in which a drawn cup needle roller bearing comprising a outer ring is press fitted.

Embodiments of the present invention will be described with reference to the drawings hereinafter. FIG. 1 is a sectional view showing a part of a shell type bearing structured body 11 in which a drawn cup needle roller bearing comprising a outer ring is press fitted. Referring to FIG. 1, the drawn cup needle roller bearing structured body 11 comprises a housing 12 comprising an inner diameter hole 13, and a drawn cup needle roller bearing 21. The drawn cup needle roller bearing 21 comprises a outer ring 22 formed of a steel plate through a drawing process and the like, a plurality of rollers 23, a retainer 24 retaining the plurality of rollers 23. Here, in order to prevent the rollers 23 and the retainer 24 from moving in the axial direction, the outer ring 22 comprises a flange 29 bent toward the inner side of the diameter direction. The retainer 24 comprises a pair of annular parts positioned at both end faces of the outer ring 22, and a column part connecting the pair of annular parts so as to form a pocket for housing each roller and having a configuration in which its center part is bent toward the inner side of the diameter direction.

The drawn cup needle roller bearing 21 is press fitted in the inner diameter hole 13 provided in the housing 12 so that an outer diameter surface 25 of the outer ring 22 abuts on an inner diameter surface 14 of the inner diameter hole 13. In addition, a rolling surface 27 of the roller 23 is in contact with an inner diameter surface 26 of the outer ring 22 and the drawn cup needle roller bearing 21 supports a rotation shaft (not shown) inserted into its inner diameter side.

Here, a manufacturing method of the retainer 24 among components of the drawn cup needle roller bearing 21 will be described.

Figure 2:
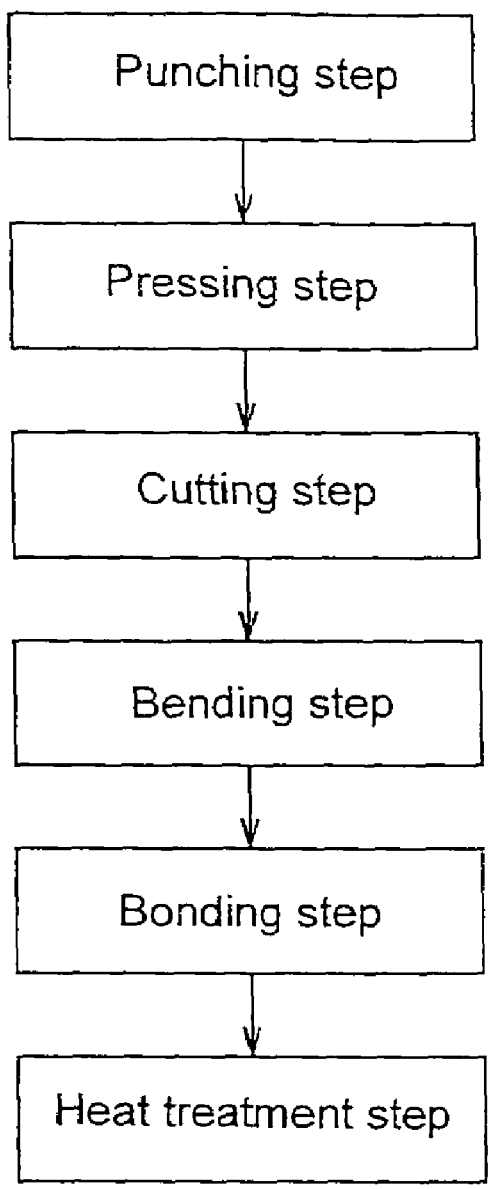
FIG. 2 is a flowchart showing manufacturing steps of a retainer contained in the drawn cup needle roller bearing.

FIG. 2 is a flowchart showing manufacturing steps of the retainer 24 of the drawn cup needle roller bearing 21 according to one embodiment of the present invention. FIGS. 3A to 3E are schematic view showing representative steps in the steps shown in FIG. 2. The manufacturing method of the retainer 24 will be described with reference to FIGS. 2 and FIGS. 3A to 3E.

Figure 3A:
FIG. 3A is a schematic view showing a representative step among the manufacturing steps of the retainer, in which a state of a band steel is shown.
Figure 3B:
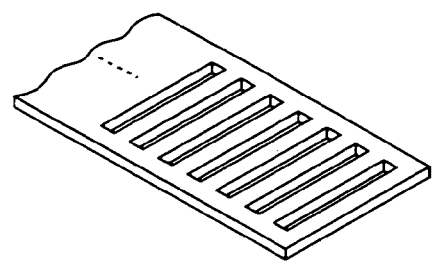
FIG. 3B is a schematic view showing a representative step among the manufacturing steps of the retainer, in which a V shape forming step is shown.

First, a steel plate as the material of the retainer 24 in a state of a band steel (FIG. 3A) is punched out to form the pocket for holding the roller 23 at a pocket punching-out step (FIG. 3B). The pocket punching-out step is performed using a punch having a punching blade in such a manner that the blade edge of the punch is pressed along a pocket configuration and punches it out. Here, the pocket is punched out from the direction that becomes the outer diameter surface when the band steel is bent into a cylindrical shape at a subsequent bending step.

Thus, in the finally manufactured retainer, the side wall surface of the column part on the side of an outer diameter surface is a sheared surface and the side wall surface of the column part on the side of an inner diameter surface is a fractured surface.

Figure 3C:
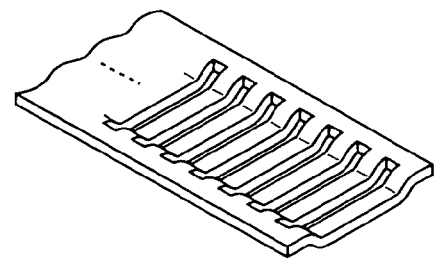
FIG. 3C is a schematic view showing a representative step among the manufacturing steps of the retainer, in which a pocket punching-out step is shown.

Then, the band steel in which the pockets are punched out is pressed so that its sectional configuration becomes V shape at a pressing step (FIG. 3C). Here, the V shape means that a step difference between the center part and the annular part of the band steel is provided in the diameter direction when the band steel having the pockets is bent into the cylindrical shape. This pressing step is performed by pressing a press against the band steel from the side that becomes the outer diameter surface to the side that becomes the inner diameter surface later. Thus, at the pressing step, the center part is recessed from the annular part in the column part in the diameter direction.

Figure 3D:
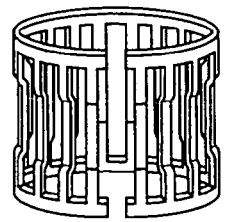
FIG. 3D is a schematic view showing a representative step among the manufacturing steps of the retainer, in which a bending step (d) is shown.
Figure 3E:
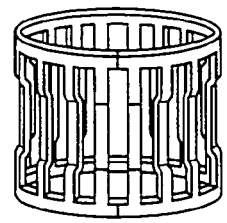
FIG. 3E is a schematic view showing a representative step among the manufacturing steps of the retainer, in which a final product is shown.

Then, the band steel is cut to a circumferential length of the retainer 24 at a cutting step. Then, the cut band steel is bent into the cylindrical configuration along the inner diameter surface of the outer ring 22 at a bending step (FIG. 3D). Then, both end surfaces are connected by welding and the like at a welding step (FIG. 3E). Then, a heat treatment such as soft-nitriding or carburized quenching is performed, whereby the retainer 24 is completed.

In addition, the plurality of rollers 23 are incorporated in the pockets of the retainer 24 manufactured by the above method, and the retainer 24 comprising the rollers 23 is incorporated in the outer ring 22, whereby the drawn cup needle roller bearing 21 is manufactured.

Figure 4:
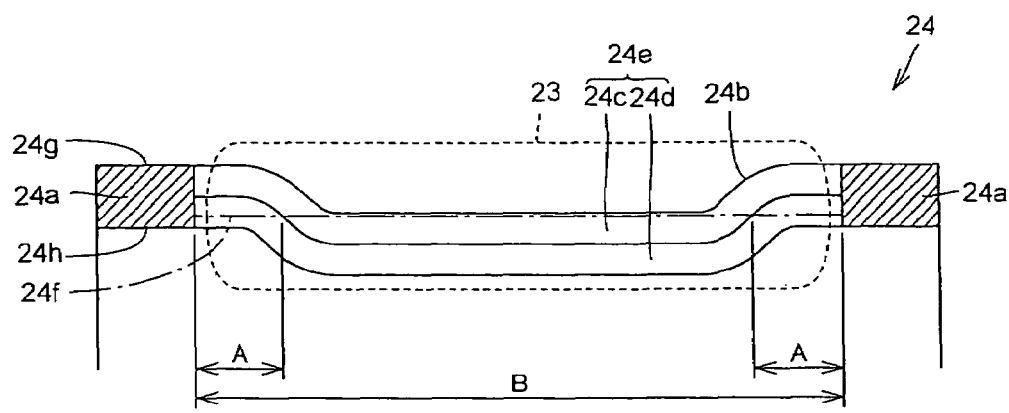
FIG. 4 is a sectional view showing the retainer contained in the drawn cup needle roller bearing in the axial direction.

FIG. 4 is a sectional view showing the retainer 24 manufactured by the above method in the axial direction. In FIG. 4, a part designated by a dotted line shows the roller 23 retained in the pocket of the retainer 24, and a dashed line shows a PCD 24f. In addition, a configuration curve 32 of a side wall surface 24e in the PCD 24f in this case is shown in FIG. 5 together with an outline 31 of the roller 23.

Figure 5:
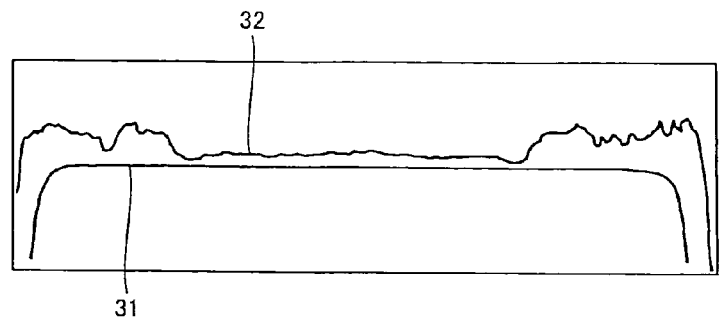
FIG. 5 is a view showing the configuration curve of a side wall surface at the PCD together with the outline of a roller.

Referring to FIGS. 4 and 5, a column part 24b has been pressed so that its sectional configuration becomes V shape toward the side of an inner diameter surface 24h at the above pressing step. Therefore, the center part of the column part 24b is positioned on the side of the inner diameter surface 24h with respect to an annular part 24a.

In addition, since the pocket has been punched out with the blade of the punch pressed from the side of an outer diameter surface 24g at the above pocket punching-out step, in a side wall surface 24e of the column part 24b, a sheared surface 24c is positioned on the side of the outer diameter surface 24g and a fractured surface 24d is positioned on the side of the inner diameter surface 24h. Therefore, at the PCD 24f, the sheared surface 24c on the side of the outer diameter surface 24g is positioned at the center part of the side wall surface 24e and the fractured surface 24d on the side of the inner diameter surface 24h is positioned at the end of the side wall surface 24e.

Here, the configuration curve 32 of the sheared surface 24c positioned at the center part of the side wall surface 24e is smooth and follows the outline 31 of the roller 23. Thus, the center part of the roller 23 and the center part of the side wall surface 24e can be appropriately in contact with each other, so that the roller 23 can be stably guided.

In addition, it is preferable that the length of the sheared surface 24c for guiding the roller 23 in the axial direction is not less than 60% of the length of the roller 23 in the axial direction. Here, to implement the length of the sheared surface 24c that is not less than 60% of the roller, the above pressing step is performed such that the length of the sheared surface 24c on the PCD 24f may become 60% of the roller or more. More specifically, the band steel is pressed into the V shape in the diameter direction in such a manner that the dimension "A" in FIG. 4, that is, the dimension of the sheared surface 24d on the side of one annular part 24a on the PCD 24f may become not more than 20% of the dimension "B" that is the length of the pocket in the axial direction. In FIG. 5, the smooth configuration along the outline 31 positioned at the center part of the configuration curve 32 is not less than 60% of the roller length.

Thus, the sheared surface 24c that is appropriately in contact with the roller can be increased, so that the motion of the roller can be controlled and the roller 23 can be stably guided.

Figure 6:
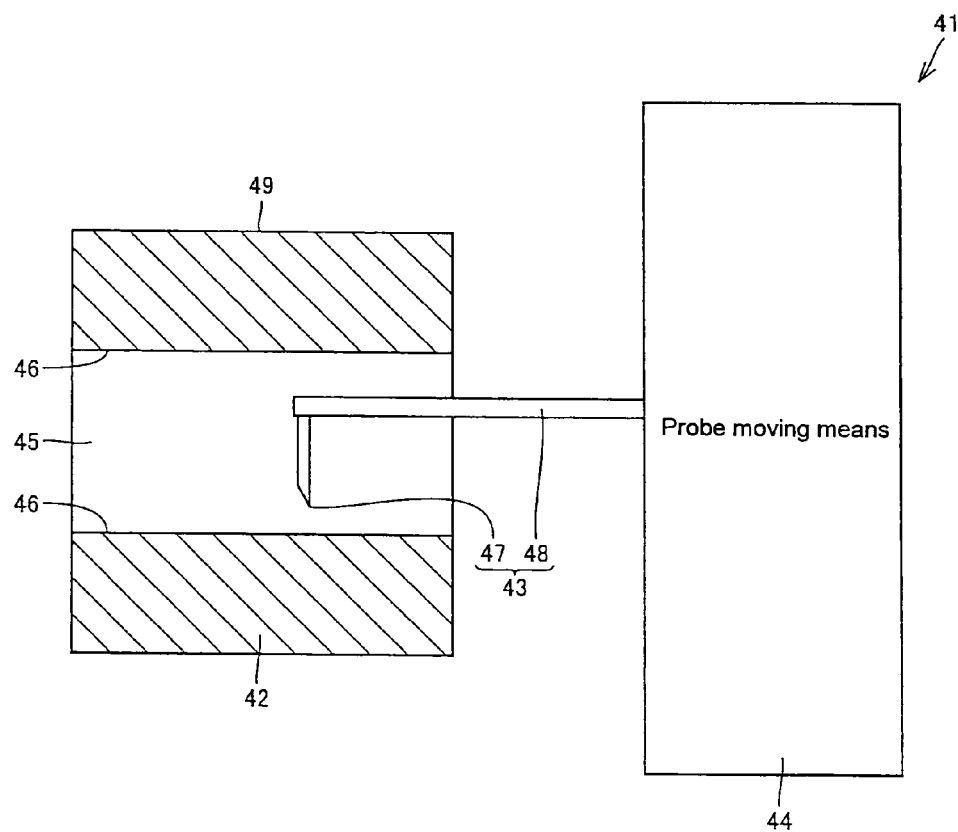
FIG. 6 is a schematic view showing a configuration measuring apparatus for measuring straightness and parallelism of the outer ring.

A method for measuring the degree of straightness and parallelism of the track surface of the outer ring will be described hereinafter. First, a description will be made of an apparatus for measuring the straightness and parallelism of the track surface. FIG. 6 is a schematic view showing a configuration measuring apparatus 41 for measuring the straightness and parallelism of the outer ring. Referring to FIG. 6, the configuration measuring apparatus 41 for measuring the outer ring comprises a reference ring 42 having an inner diameter hole 45, a probe 43 for measuring the generatrix configuration of the inner diameter surface of the outer ring press fitted in the inner diameter hole 43, and an outer diameter surface 49 or an inner diameter surface 46 of the reference ring 42 in the axial direction, and probe moving means 44 for moving the probe 43 in the axial direction to scan them.

The reference ring 42 is cylindrical and has the inner diameter hole 45 in which the outer ring can be press fitted. In addition, the inner diameter surface 46 of the inner diameter hole 45 and the outer diameter surface 49 of the reference ring 42 are concentrically provided, so that either surface becomes a reference surface in measuring the parallelism to the track surface of the press fitted outer ring.

The probe 43 comprises a head 47 for measuring the generatrix configuration of the object to be measured by touching the object, and an arm 48 connecting the head 47 and the probe moving means 44.

The probe moving means 44 comprises moving means for moving the probe 43 so that the probe 43 scans the inner diameter surface of the outer ring press fitted in the reference ring 42, and moving means for moving the probe 43 so that the probe 43 scans the outer diameter surface 49 or the inner diameter surface 46 of the reference ring 42. The probe 43 can be moved by the probe moving means in the axial direction, that is, the lateral direction in FIG. 6, and it can be moved in the vertical direction in FIG. 6 while it is being moved in the axial direction. That is, even when the object to be measured is inclined, since the movement in the lateral direction is not prevented, the probe 43 can be moved along the configuration of the object to be measured.

A description will be made of a method for measuring the straightness and parallelism of the track surface of the outer ring using the above configuration measuring apparatus 41 hereinafter. In addition, although the outer ring in which the flange is bent toward the inner side of the diameter direction at one end is used as the outer ring whose straightness is measured here, the same can be applied to a case where a outer ring is measured in which flanges are bent toward the inner side of the diameter direction on both ends like the outer ring 22 contained in the above drawn cup needle roller bearing 21.

Figure 7:
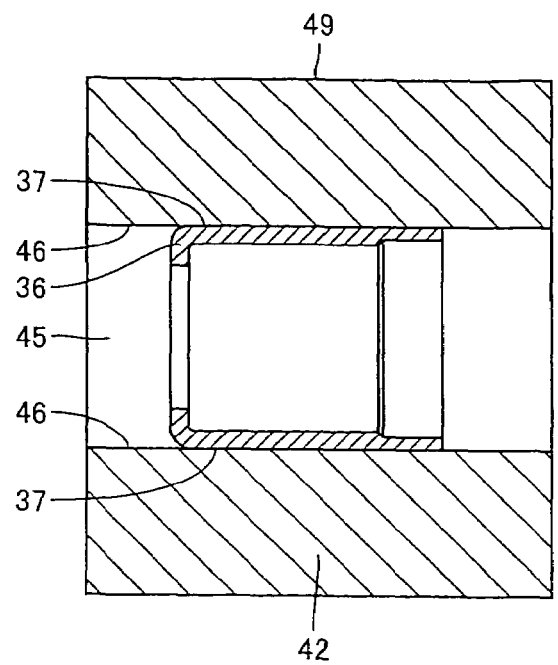
FIG. 7 is a sectional view showing a state in which the outer ring is press fitted in an inner diameter hole of a reference ring in the axial direction.

First, the outer ring is press fitted in the inner diameter hole 45 of the reference ring 42. FIG. 7 is a sectional view in the axial direction, showing a state in which an outer ring 36 in which the flange is bent at one end is press fitted. Referring to FIG. 7, the outer ring 36 is press fitted so that an outer diameter surface 37 of the outer ring 36 and an inner diameter surface 46 of the inner diameter hole 45 are in contact with each other.

Figure 8:
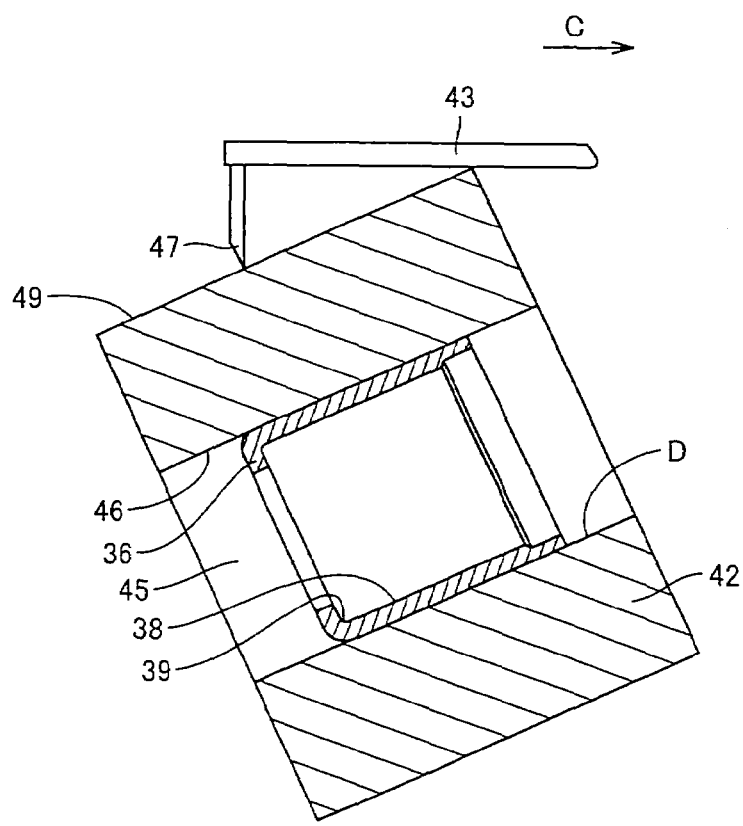
FIG. 8 is a sectional view showing the reference ring in the axial direction when the generatrix configuration of the outer diameter surface of the reference ring is measured.

Then, the generatrix configuration of the outer diameter surface 49 of the reference ring 42 is measured. FIG. 8 is a sectional view in the axial direction, showing the reference ring 42 when the generatrix configuration of the outer diameter surface 49 is measured. Referring to FIG. 8, the reference ring 42 is inclined at a certain angle. Thus, the generatrix configurations of the surface of a flange 40 of the outer ring 36 on the inner diameter side and an inner diameter surface 38 of a cylindrical part can be measured.

Then, the head 47 is brought to be in contact with the outer diameter surface 49 of the reference ring 42, and the probe 43 is moved in the direction shown by an arrow C. Thus, the generatrix configuration of the outer diameter surface 49 of the reference ring 42 that is the reference surface is measured. In addition, in this case, the generatrix configuration of the inner diameter surface 46 of the inner diameter hole 45 that is the reference surface may be measured. For example, the generatrix configuration of the inner diameter surface 46 at the part shown by "D" in FIG. 8 may be measured. Thus, even when the generatrix configuration of the outer diameter surface 49 cannot be measured, the generatrix configuration of the inner diameter surface 46 is measured as the reference surface in measuring the parallelism.

Figure 9:
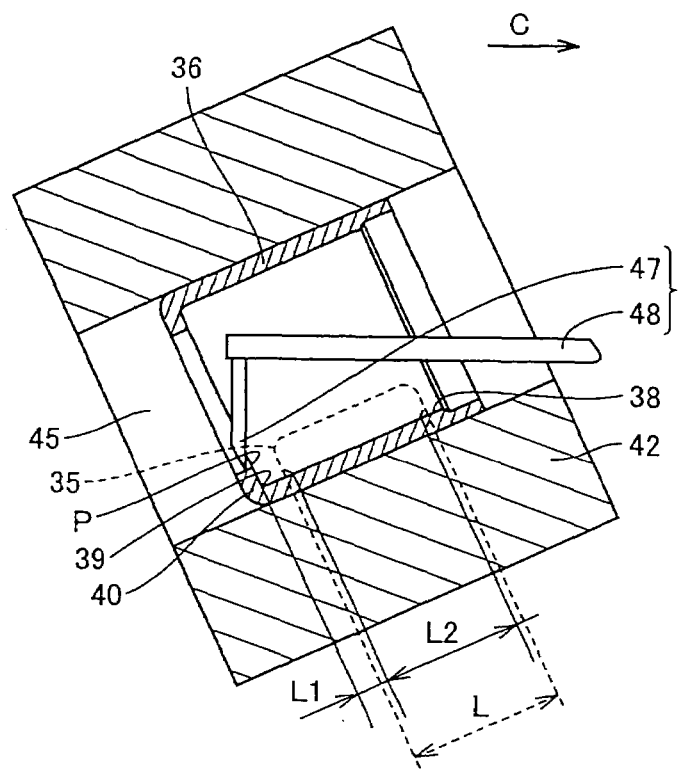
FIG. 9 is a sectional view showing the reference ring in the axial direction when the generatrix configuration of the inner diameter surface of the reference ring is measured.

Then, the generatrix configuration of the inner diameter surface 38 of the press fitted outer ring 36 is measured. FIG. 9 is a sectional view showing the reference ring 42 in the axial direction when the generatrix configuration of the inner diameter surface 38 of the outer ring 36 is measured. In addition, in FIG. 9, the part shown by a dotted line designates a roller 35 incorporated in the outer ring 36. Referring to FIG. 9, while the reference ring 42 in which the outer ring 36 is press fitted is inclined at a certain angle, the head 47 is brought to be in contact with the inner diameter surface of the flange 40 of the outer ring 36. Thus, a corner P of the flange 40 on the inner diameter side can be a starting point to measure the generatrix configuration in the axial direction. In addition, since the reference ring 42 is inclined at a certain angle, even when the head 47 and the arm 48 are perpendicularly connected as shown in the drawing, the head 47 can be easily in contact with the surface in the vicinity of a bent part 39 that is a crossing part between the flange 40 and the inner diameter surface 38.

Then, the head 47 is moved in the direction of the arrow "C" to measure the generatrix configuration of the inner diameter surface 38 of the outer ring 36. According to the generatrix configuration of the inner diameter surface 38, since the generatrix configuration is measured from the inner diameter surface of the flange 42 to the open end of the outer ring 36, the measured generatrix configuration of the inner diameter surface 38 includes a part in which the roller 35 is not in contact with the outer ring 36.

Thus, in the inner diameter surface 38 of the outer ring 36, the straightness and parallelism are measured within a range "L2" in FIG. 9 as a range for measuring the straightness and parallelism of the track surface in which the roller 35 rolls. The range "L2" is a range such that $L2 \geqq 0.8 \times L$ when the roller length is "L". When the range having the predetermined length or more is defined as "L2", the straightness and parallelism to be measured can be high in reliability. In addition, when the dimension from the corner P of the flange 40 on the inner diameter side to the starting point of the range "L2" is "L1", the dimension "L1" is ranged such that $0.8 \text{ mm} \leqq L1 \leqq 2$ mm. The region "L1" corresponds to the part in which the roller 35 and the outer ring 36 are not in contact with each other in general.

Figure 10:
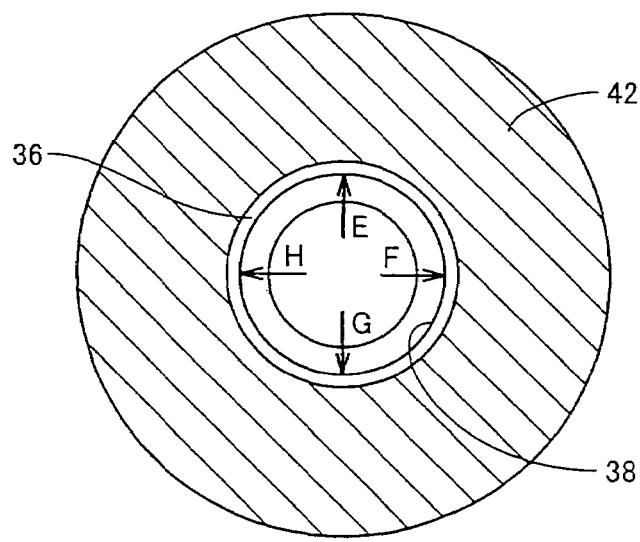
FIG. 10 is a sectional view showing a case where the reference ring in which the outer ring is press fitted is cut in the diameter direction.

FIG. 10 is a sectional view showing the reference ring 42 in which the outer ring 36 is press fitted when the reference ring 42 is cut in the diameter direction. Referring to FIG. 10, the generatrix configuration of the inner diameter surface 38 is measured in four directions that are symmetric laterally and vertically as shown by arrows E, F, G and H. Thus, the straightness and parallelism can be measured with high precision. In addition, when the precision is to be higher, the measurement may be performed in directions more than the above 4 directions.

Figure 11:
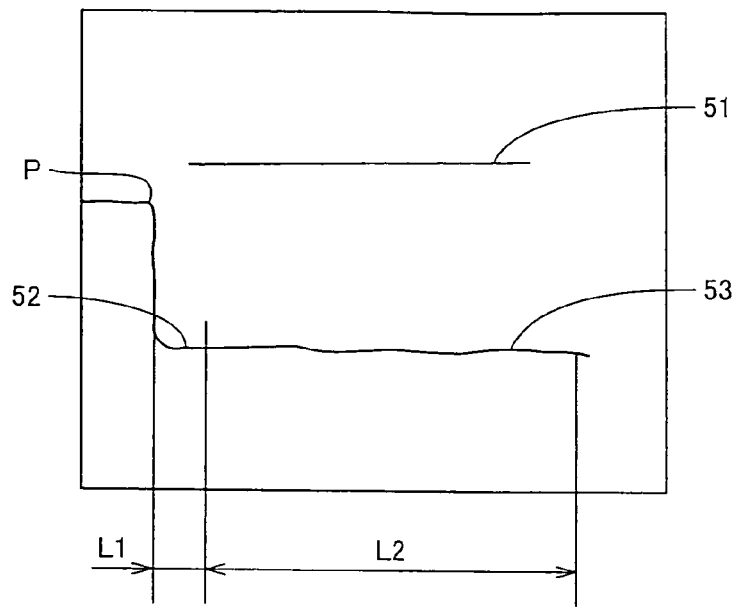
FIG. 11 is a view in which the generatrix configuration of the inner diameter surface of the outer ring and the outer diameter surface of the reference ring are measured.

FIG. 11 shows a schematic view showing the generatrix configurations measured as described above. Referring to FIG. 11, the horizontal axis designates the dimension in the axial direction and the vertical axis designates measured generatrix configurations. Based on the generatrix configuration 51 of the outer diameter surface 49 of the reference ring 42 serving as the reference surface, the straightness and parallelism are measured from the generatrix configuration 53 within the range "L2" in the inner diameter surface 38 excluding the generatrix configuration 52 within the range "L1". That is, as the straightness, a difference between a maximum value and a minimum value of the generatrix configuration 53 is to be found, and as the parallelism, the degree of parallelism between the generatrix configuration 51 and the generatrix configuration 53 is to be found. Thus, the track surface on which the roller rolls is provided so as to be straight and parallel.

A test for confirming an anti-seizing property was performed for drawn cup needle roller bearings comprising outer rings having different values in straightness and parallelism. In addition, the configuration measurement is made by an outline measuring machine (CV3000 produced by Mitutoyo corporation).

The test conditions are as follows. The result of this test is shown in Table 1.

Testing machine: 2-cycle engine
Mixture ratio: gasoline/lubricant oil=100/1
Operation pattern: full throttle
Operation time: two hours or until seizing is generated

TABLE 1

| Sample | parallelism | straightness | Number of seizing |
|---|---|---|---|
| Embodiment 1 | 0.010 | 0.006 | 0 |
| Conventional sample 1 | 0.018 | 0.011 | 3 |
| Conventional sample 2 | 0.010 | 0.012 | 4 |
| Conventional sample 3 | 0.017 | 0.009 | 7 |

Referring to Table 1, according to a conventional sample 1, seizing was generated in three drawn cup needle roller bearings out of ten. According to a conventional sample 2, seizing was generated in four drawn cup needle roller bearings out of ten. According to a conventional sample 3, seizing was generated in seven drawn cup needle roller bearings out of ten. Meanwhile, according to a sample in this embodiment, seizing was not generated in all of ten drawn cup needle roller bearings.

Therefore, when the parallelism is not more than 0.010 mm and the straightness is not more than 0.008 mm, the roller can roll stably and the seizing can be prevented.

Figure 12:
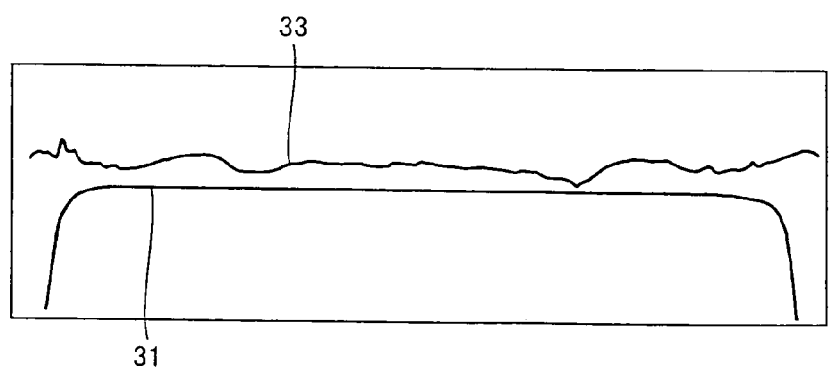
FIG. 12 is a view showing a configuration curve 33 of a side wall surface 25 at the PCD of a sample A in which its sheared surface is 50%, together with the outline of the roller.

In addition, a drawn cup needle roller bearing containing the retainer in which the sheared surface is not less than 60% of the roller length shown in FIG. 5 as an embodiment 2, a drawn cup needle roller bearing containing a retainer in which a sheared surface shown as the configuration curve 33 in FIG. 12 is 50% of a roller length as a sample A, and a drawn cup needle roller bearing containing the conventional retainer as a conventional sample 4 are used in a con-rod and a test for confirming the anti-seizing property was performed for them.

The test condition is the same as the above. The result of this test is shown in Table 2.

TABLE 2

Figure 19:
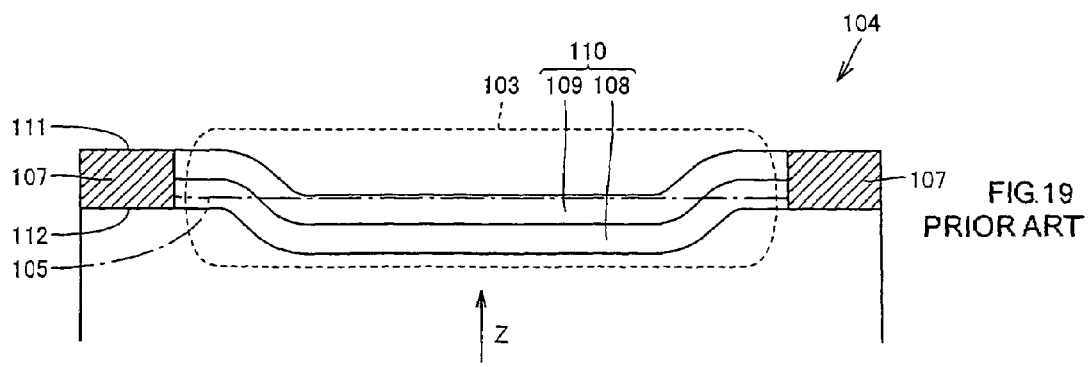
FIG. 19 is a sectional view in the axial direction in which the sheared surface is positioned on the side of the inner diameter surface and the fractured surface is positioned on the side of the outer diameter surface in a conventional example.
Figure 20:
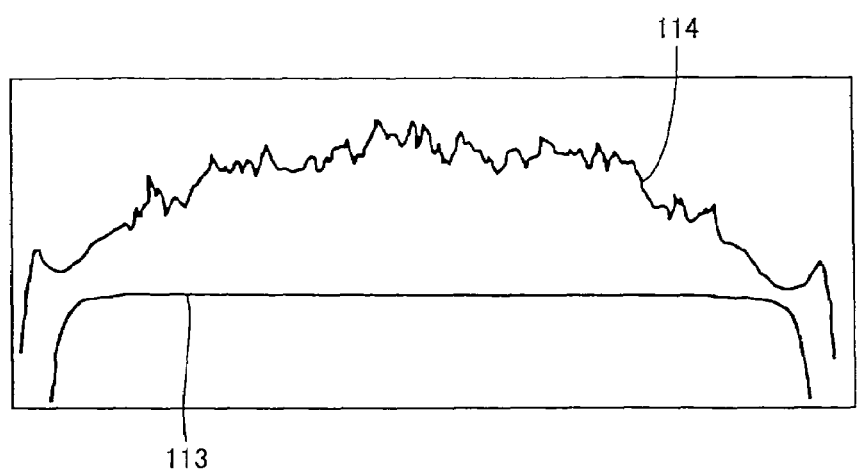
FIG. 20 is a view showing the configuration curve of a side wall surface at the PCD in the conventional example, together with the outline of a roller.

| Sample | Test result | Configuration curve | Length of sheared surface |
|---|---|---|---|
| Embodiment 2 | 0 | FIG. 5 | 60~70% |
| Conventional sample 4 | 8 | FIG. 19 | 0~10% |
| Sample A | 6 | FIG. 12 | 45~55% |

Table 2 shows the result of the above test. Referring to Table 2, according to the conventional sample 4, seizing was generated in eight drawn cup needle roller bearings out of ten. According to the sample A, seizing was generated in six drawn cup needle roller bearings out of ten. Meanwhile, according to the sample in the embodiment 2, seizing was not generated in all of ten drawn cup needle roller bearings.

Therefore, when the length of the sheared surface in the axial direction is not less than 60% of the roller length, there is no seizing generated, so that the length of the sheared surface in the axial direction needs to be at least 60%.

As described above, a piston pin supporting structure of an engine or a crankshaft supporting structure of an engine comprising the drawn cup needle roller bearing containing the retainer and the outer ring described above can improve their anti-seizing property. In addition, a 2-cycle engine comprising the above piston pin supporting structure of the engine or the above crankshaft supporting structure of the engine can improve its anti-seizing property.

Although the entire reference ring is inclined when the straightness and parallelism of the track surface of the outer ring are measured in the above embodiment, the present invention is not limited to this. For example, a structure in which a head of a probe is formed into a slanting configuration so that the head of the probe can abut on the corner of a flange on the inner diameter side without inclining the reference ring may be employed.

In addition, although the generatrix configuration of the outer diameter surface of the reference ring or the inner diameter surface of the outer ring are measured with the head of the probe touched in the above embodiment, the present invention is not limited to this. For example, the generatrix configuration of the outer diameter surface of the reference ring and the like may be measured by a laser and the like without any contact between them.

Figure 13:
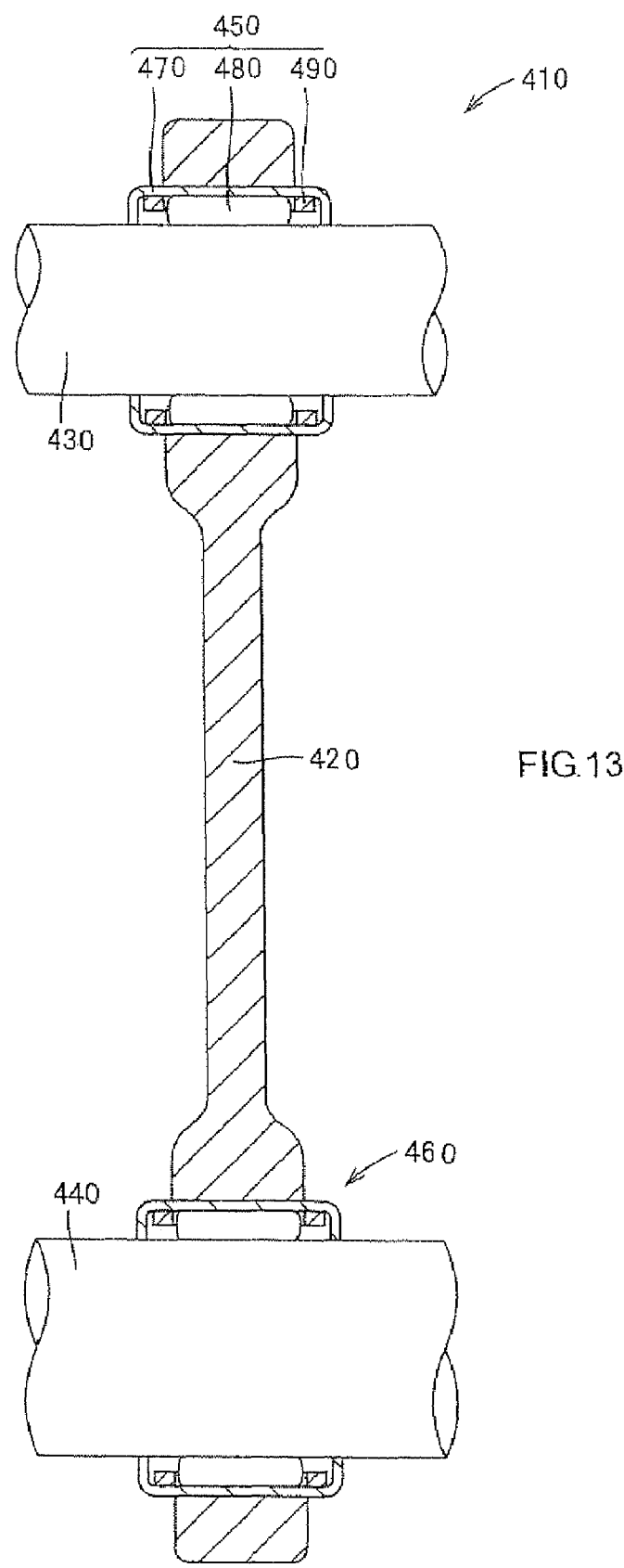
FIG. 13 is a sectional view showing a 2-cycle engine according to one embodiment of the present invention.
Figure 14:
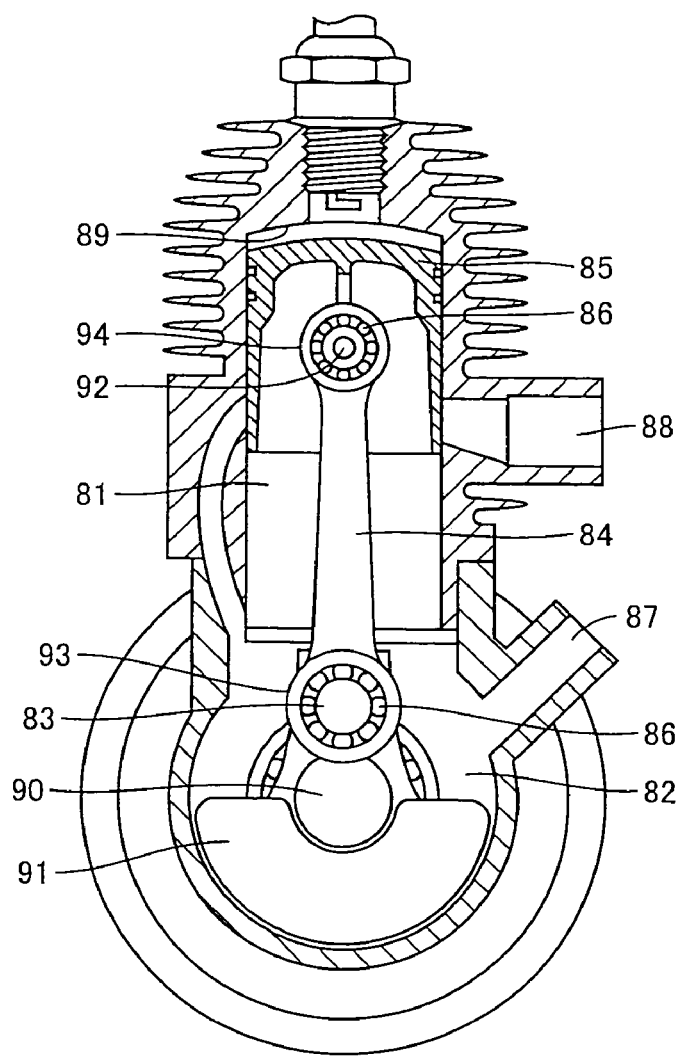
FIG. 14 is a longitudinal sectional view showing a 2-cycle engine in which the drawn cup needle roller bearings are used in the large end part and the small end part of a con-rod.
Figure 15A:
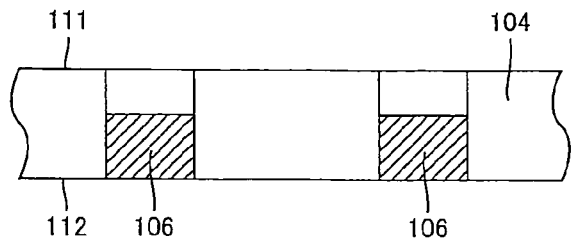
FIG. 15A is a sectional view in the diameter direction showing a state before the band steel is bent into the cylindrical shape.
Figure 15B:
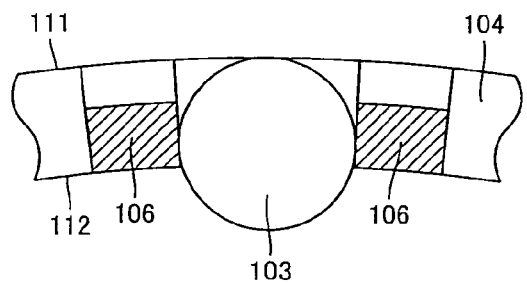
FIG. 15B is a sectional view in the diameter direction showing a state after a band steel has been bent into a cylindrical shape.
Figure 16:
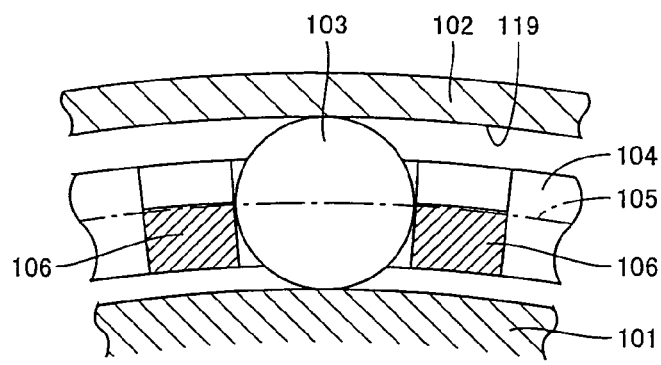
FIG. 16 is a view showing a state in which a pocket of the retainer pressed into the V shape at a pressing step contains a roller.
Figure 17:
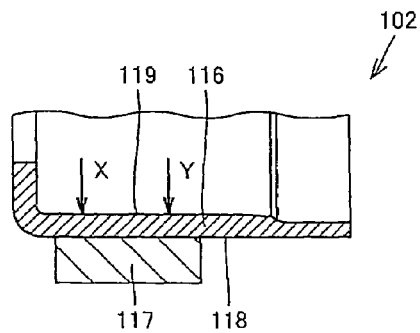
FIG. 17 is a view showing a state in which the thickness of the cylindrical part of a conventional outer ring is measured.
Figure 18:
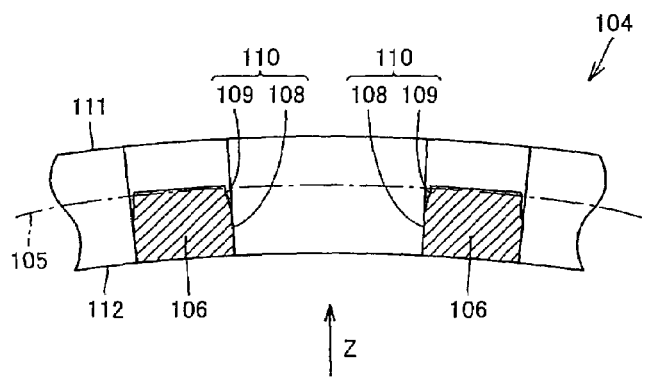
FIG. 18 is a sectional view in the diameter direction showing a retainer 104 when a sheared surface is positioned on the side of an inner diameter surface, and a fractured surface is positioned on the side of an outer diameter surface.

As one example of the drawn cup needle roller bearing structured body comprising the above drawn cup needle roller bearing, there is a 2-cycle engine having the drawn cup needle roller bearing comprising the above outer ring. FIG. 13 is a schematic sectional view showing the essential part of the 2-cycle engine.

Referring to FIG. 13, a 2-cycle engine 410 comprises a piston (not shown) moving in a straight line back and forth by combustion of mixed gas, a crankshaft 440 outputting rotary motion, a con-rod 420 connecting the piston and the crankshaft and converting linear reciprocating motion to the rotary motion, and a drawn cup needle roller bearing press fitted in the large end part or the small end part of the con-rod 420 and supporting the crankshaft 440 or a piston pin 430. The piston is connected to the small end part of the con-rod 420 by the piston pin 430 through the drawn cup needle roller bearing 450. In addition, the crankshaft 440 is connected to the large end part of the con-rod 420 through the drawn cup needle roller bearing 460.

The drawn cup needle roller bearing 450 supporting the piston pin 430 is press fitted in an inner diameter hole provided in the small end part of the con-rod 420, whereby the piston pin supporting structure of the 2-cycle engine 410 is formed. Similarly, the drawn cup needle roller bearing 460 supporting the crankshaft 440 is press fitted in an inner diameter hole provided in the large end part of the con-rod 420, whereby the crankshaft supporting structure of the 2-cycle engine 410 is formed.

The drawn cup needle roller bearing 450 comprises the above outer ring 470, a plurality of rollers 480, and a retainer 490 retaining the rollers 480. In addition, the drawn cup needle roller bearing 460 has the same constitution as that of the drawn cup needle roller bearing 450 although their sizes are different such that it comprises an outer ring, a plurality of rollers and a retainer. Here, since the track surface of the above outer ring has the straightness of 0.008 mm or less and parallelism of 0.015 mm or less when the outer ring is press fitted in the reference ring, the rollers 48' can roll stably. Therefore, the anti-seizing property can be improved at the large end part and the small end part of the con-rod.

Thus, there is provided the 2-cycle engine having the large end part and the small end part of the con-rod in which the anti-seizing property is improved.

In addition, although the drawn cup needle roller bearing comprises the retainer in the above embodiment, the present invention is not limited to this. For example, the bearing may be a full-type roller bearing.

Furthermore, although the entire reference ring is inclined when the straightness and parallelism of the track surface are measured in the above embodiment, the present invention is not limited to this. For example, a structure in which a head of a probe is formed into a slanting configuration such that the head of the probe can abut on the corner of a flange on the inner diameter side without inclining the reference ring may be employed.

In addition, although the generatrix configuration of the outer diameter surface of the reference ring or the inner diameter surface of the outer ring are measured with the head of the probe touched in the above embodiment, the present invention is not limited to this. For example, the generatrix configuration of the outer diameter surface of the reference ring and the like may be measured by a laser and the like without any contact between them.

In addition, although the con-rod having the inner diameter holes in the small end part and the large end part is used as the housing in the drawn cup needle roller bearing structured body in the above embodiment, the present invention is not limited to this. For example, another member having an inner diameter hole in which the drawn cup needle roller bearing can be press fitted may be used.

Although the embodiments of the present invention have been described with reference to the drawings in the above, the present invention is not limited to the above-illustrated embodiments. Various kinds of modifications and variations may be added to the illustrated embodiments within the same or equal scope of the present invention. Since the roller can roll stably in the outer ring and the drawn cup needle roller bearing according to the present invention, they can be effectively used as an outer ring in which the anti-seizing property is improved and the drawn cup needle roller bearing comprising such outer ring.

In addition, since the roller can roll stably in the drawn cup needle roller bearing according to the present invention and the drawn cup needle roller bearing structured body comprising such drawn cup needle roller bearing, they can be used in the con-rod of the 2-cycle engine in which the anti-seizing property is improved.

Furthermore, since the piston pin supporting structure of the engine, the crankshaft supporting structure of the engine, and the 2-cycle engine according to the present invention comprise the drawn cup needle roller bearing in which the roller can roll stably, they can be effectively used as a piston pin supporting structure of an engine, a crankshaft supporting structure of an engine, and a 2-cycle engine the crankshaft supporting structure in which the anti-seizing property is improved.

What is claimed is:

1. A outer ring comprising a track surface on the side of an inner diameter, wherein
   when said outer ring is press fitted in a reference ring having an inner diameter hole in which said outer ring is to be press fitted, the straightness of the track surface of said outer ring in the axial direction is not more than 0.008 mm, and
   the parallelism based on the inner diameter surface or outer diameter surface of said reference ring is not more than 0.015 mm.

2. A drawn cup needle roller bearing comprising the outer ring according to claim 1, and a plurality of rollers.

3. A drawn cup needle roller bearing comprising:
   the outer ring according to claim 1, a plurality of rollers, and a retainer retaining said rollers, wherein
   said retainer comprises a pair of annular parts, and column parts connecting said pair of annular parts so as to form pockets for housing said rollers,
   the side wall surface of said column part comprises a sheared surface provided when said pocket is formed by a punching blade, and a fractured surface fractured by a material pressed by the punching blade, and
   said roller is guided by the sheared surface.

4. The drawn cup needle roller bearing according to claim 3, wherein
   said column part has a configuration in which its center part is recessed toward the inner side of the diameter direction, said sheared surface is positioned on the outer side of the diameter direction and said fractured surface is positioned on the inner side of the diameter direction.

5. The drawn cup needle roller bearing according to claim 3, wherein
   the length of said sheared surface that guides the roller in the axial direction is not less than 60% of the length of the roller in the axial direction.

6. A piston pin supporting structure of an engine comprising the drawn cup needle roller bearing according to claim 3 and further comprising:
   a con-rod converting linear reciprocating motion to rotary motion and having an inner diameter hole at a small end part; and
   a piston pin connecting said con-rod and a piston through said inner diameter hole, wherein
   said drawn cup needle roller bearing is press fitted in said inner diameter hole to support said piston pin.

7. A crankshaft supporting structure of an engine comprising the drawn cup needle roller bearing according to claim 3 and further comprising:
   a con-rod converting linear reciprocating motion to rotary motion and having an inner diameter hole at a large end part; and a crankshaft connected to the large end part of said con-rod through said inner diameter hole and outputting the rotary motion, wherein said drawn cup needle roller bearing is press fitted in said inner diameter hole to support said crankshaft.

8. A 2-cycle engine comprising the piston pin supporting structure of the engine according to claim 6.

9. A 2-cycle engine comprising the crankshaft supporting structure of the engine according to claim 7.

10. A drawn cup needle roller bearing structured body comprising a housing having an inner diameter hole, and a drawn cup needle roller bearing press fitted in said inner diameter hole, wherein said drawn cup needle roller bearing comprises a plurality of rollers, a outer ring having a track surface on the side of an inner diameter, a pair of annular parts, and column parts connecting said pair of annular parts so as to form pockets for housing said rollers, the side wall surface of said column part comprises a sheared surface provided when said pocket is formed by a punching blade, and a fractured surface fractured by a material pressed by the punching blade, said roller is guided by said sheared surface, and when said outer ring is press fitted in a reference ring having an inner diameter hole in which said outer ring is to be press fitted, the straightness of the track surface of said outer ring in the axial direction is not more than 0.008 mm, and the parallelism based on the inner diameter surface or outer diameter surface of said reference ring is not more than 0.015 mm.

* * * * *